(12) United States Patent
Francisco et al.

(10) Patent No.: US 10,390,059 B2
(45) Date of Patent: Aug. 20, 2019

(54) LATENT BINDING OF CONTENT BASED ON USER PREFERENCE

(71) Applicant: COMCAST CABLE COMMUNICATIONS, LLC, Philadelphia, PA (US)

(72) Inventors: Mark Francisco, Clarksburg, NJ (US); Paul Egenhofer, Littleton, CO (US); Rustam Khashimkhodjaev, Parker, CO (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 14/476,836

(22) Filed: Sep. 4, 2014

(65) Prior Publication Data

US 2016/0073138 A1    Mar. 10, 2016

(51) Int. Cl.
*H04N 21/242* (2011.01)
*H04N 21/472* (2011.01)
(Continued)

(52) U.S. Cl.
CPC ..... *H04N 21/2393* (2013.01); *H04N 21/2347* (2013.01); *H04N 21/2368* (2013.01); *H04N 21/23605* (2013.01); *H04N 21/23614* (2013.01); *H04N 21/234345* (2013.01); *H04N 21/242* (2013.01); *H04N 21/472* (2013.01); *H04N 21/4755* (2013.01); *H04N 21/4856* (2013.01);
(Continued)

(58) Field of Classification Search
CPC ....... H04N 21/2393; H04N 21/234345; H04N 21/2347; H04N 21/234435; H04N 21/23605; H04N 21/23614; H04N 21/2368; H04N 21/242; H04N 21/472; H04N 21/4755; H04N 21/4856; H04N 21/6405; H04N 21/6408; H04N 21/8153
USPC .......................................................... 725/28
See application file for complete search history.

(56) References Cited

U.S. PATENT DOCUMENTS 5,894,320 A * 4/1999 Vancelette ........... H04N 5/4401
348/E5.004
6,630,963 B1 * 10/2003 Billmaier ............... H04H 20/18
348/485
(Continued)

FOREIGN PATENT DOCUMENTS

EP          2523370 A2     11/2012

OTHER PUBLICATIONS

Open Source Media Framework Developer's Guide, Delivering Content: Supporting Alternate Audio Tracks in HTTP Streaming Videos, pp. 22-23 (2011).
(Continued)

*Primary Examiner* — Nathan J Flynn
*Assistant Examiner* — Caroline Somera
(74) *Attorney, Agent, or Firm* — Ballard Spahr LLP

(57) ABSTRACT

Methods and systems for providing user defined content transmissions are disclosed. An example method can comprise receiving a request for first content and receiving a first preference. First content can be retrieved from a first source based on the request for first content. Second content can be retrieved from a second source based on the first preference. The first content and second content can be packaged for transmission in response to receiving the request and the first preference.

20 Claims, 6 Drawing Sheets

(51) Int. Cl.
*H04N 21/2343* (2011.01)
*H04N 21/2368* (2011.01)
*H04N 21/81* (2011.01)
*H04N 21/236* (2011.01)
*H04N 21/239* (2011.01)
*H04N 21/475* (2011.01)
*H04N 21/485* (2011.01)
*H04N 21/2347* (2011.01)
*H04N 21/6405* (2011.01)
*H04N 21/6408* (2011.01)

(52) U.S. Cl.
CPC ..... *H04N 21/6405* (2013.01); *H04N 21/6408* (2013.01); *H04N 21/8153* (2013.01)

(56) References Cited

U.S. PATENT DOCUMENTS

| | | | |
|---|---|---|---|
| 8,832,768 B1* | 9/2014 | Inzerillo | H04N 21/47202 348/500 |
| 9,571,870 B1* | 2/2017 | Wilson | H04N 21/4722 |
| 2002/0138852 A1* | 9/2002 | Reynolds | H04N 21/235 725/136 |
| 2008/0284910 A1 | 11/2008 | Erskine et al. | |
| 2010/0106482 A1 | 4/2010 | Hardacker et al. | |
| 2011/0072147 A1* | 3/2011 | Kirksey | H04N 21/2368 709/231 |
| 2011/0135282 A1 | 6/2011 | Whiteing | |
| 2011/0138433 A1 | 6/2011 | Whiteing | |
| 2011/0246566 A1* | 10/2011 | Kashef | G06F 17/30035 709/203 |
| 2012/0002109 A1 | 1/2012 | Kennedy | |
| 2012/0013746 A1* | 1/2012 | Chen | G11B 27/034 348/180 |
| 2012/0066594 A1 | 3/2012 | Gavade et al. | |
| 2012/0307149 A1* | 12/2012 | Meek | H04N 5/607 348/515 |
| 2013/0066785 A1* | 3/2013 | Farrugia | G06F 21/10 705/57 |
| 2014/0373042 A1* | 12/2014 | Le Pelerin | H04N 21/4348 725/31 |
| 2016/0080685 A1* | 3/2016 | De Saint Salvy | H04N 21/4302 386/285 |

OTHER PUBLICATIONS

Real Eyes, Late-Binding Audio: Attaching Alternate Audio Tracks to HTTP Video Streams Using OSMF (2013) (18 pages).
Extended European Search Report dated Jan. 27, 2016 for application EP 15183904.0, filed on Sep. 4, 2015 and published as EP 2993908 on Mar. 9, 2016 (Applicant—Comcast Cable Comm., LLC // Inventor—Francisco, et al.) (9 pages).

* cited by examiner

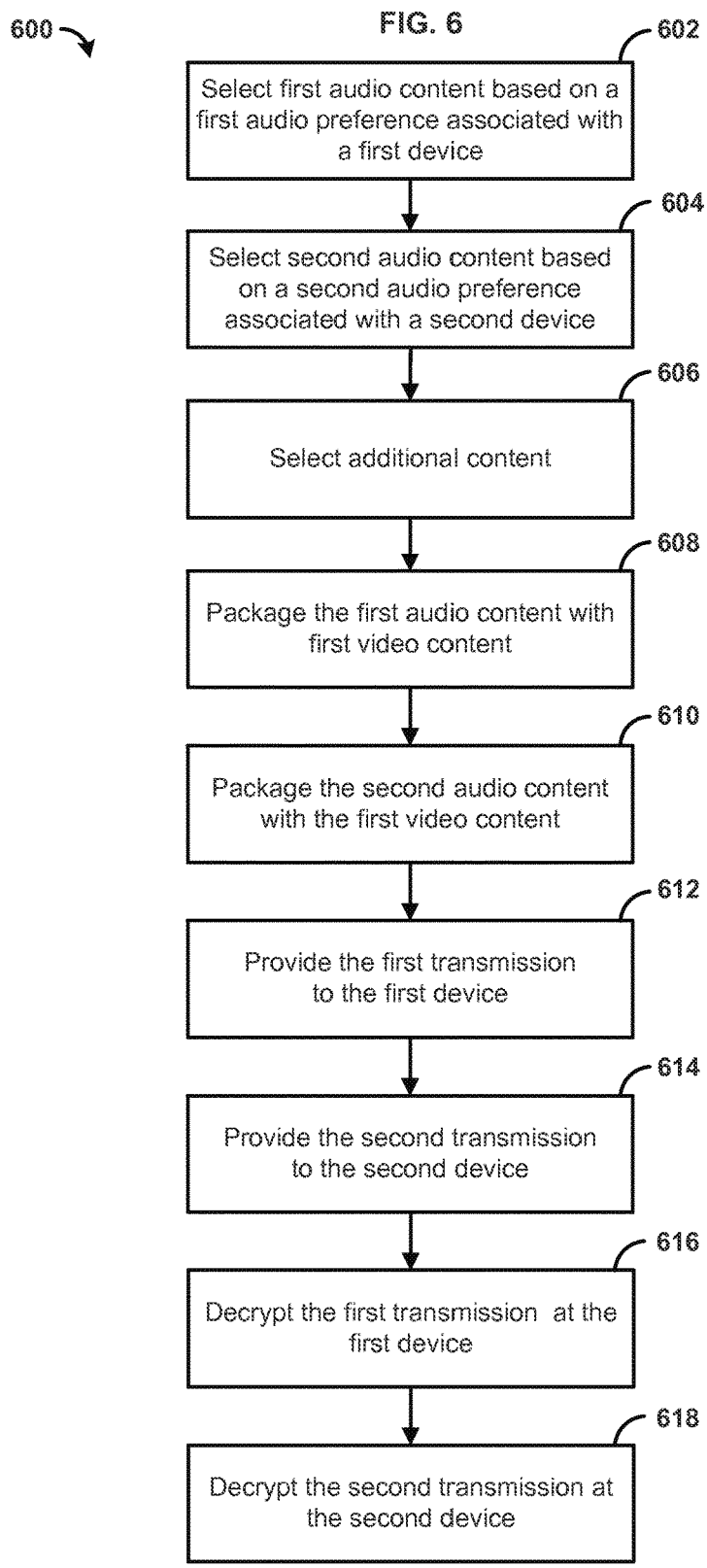

LATENT BINDING OF CONTENT BASED ON USER PREFERENCE

BACKGROUND

Networks allow for the distribution of a variety of content. Content can be distributed using adaptive bit rate streaming or other streaming technologies, for example, and content streams may have predefined audio and video content. Content providers and users are limited to these predefined streams and may be unable to select or couple audio and video as desired. Thus, there is a need for more sophisticated methods and systems for providing user defined content streams.

SUMMARY

It is to be understood that both the following general description and the following detailed description are exemplary and explanatory only and are not restrictive, as claimed. Some disclosed methods and systems related to user defined content streams. An example method can comprise receiving a request for first content and receiving a first preference. First content can be retrieved from a first source based on the request for first content. Second content can be retrieved from a second source based on the first preference. The first content and second content can be packaged for transmission (e.g., as a content stream, file transfer, etc.) in response to receiving the request and the first preference.

In an aspect, an example method can comprise providing a multicast content transmission to a plurality of devices. The plurality of devices can comprise a first device and a second device. A first content preference associated with the first device and a second content preference associated with the second device can be accessed or received. A first unicast content transmission can be provided to the first device based on the first content preference. A second unicast content transmission can be provided to the second device based on the second content preference.

In another aspect, an example method can comprise selecting first audio content based on a first audio preference associated with a first device, selecting second audio content based on a second audio preference associated with a second device. The first audio content can be packaged with first video content first content for transmission (e.g., as content stream, file transfer, etc.). The second audio content can be packaged with the first video content as second content for transmission (e.g., as a content stream, file transfer, etc.). The first content transmission can be provided to the first device, and the second content transmission can be provided to the second device.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 6 is a flowchart illustrating yet another example method.

DETAILED DESCRIPTION

Figure 1:
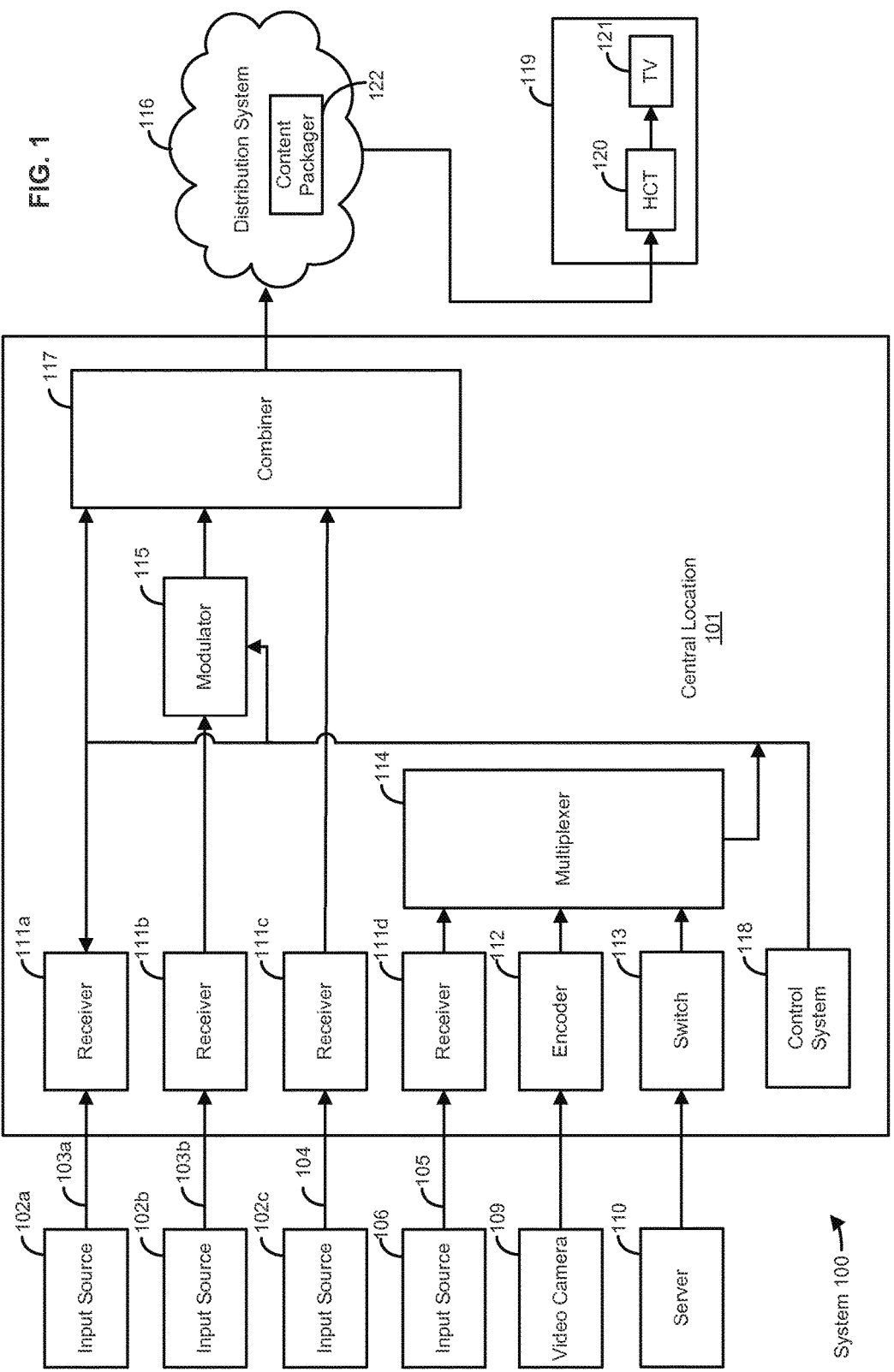
FIG. 1 illustrates various aspects of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to providing content (e.g., video, audio, text, images, data, and/or the like) through dynamically generated content transmissions (e.g., content streams, file transfers). For example, content transmissions can be dynamically generated by selecting one or more content transmissions, such as video transmissions and audio transmissions. The selected content transmissions can be packaged and/or rendered as one content transmission. For example the content transmissions can be packaged by a device in a distribution network. The device can be located at various places in the network such as, a user device, edge device, or other upstream device. In one aspect, the content can be selected from one or more content sources. For example, first content (e.g., video, audio, data) can be selected from a first source. Second content (e.g., video, audio, data) can be selected from a second source. Third content (e.g., video, audio stream, data) can be selected from the first source, second source, or third source. In one aspect, the content can be selected based on a preference or other information associated with and/or received from a user device. For example, first content (e.g., video, audio, data) can be selected based on a content identifier. Second content (e.g., video, audio, data) can be selected based on the preference. The device can package the first content and second content as a single content transmission (e.g., content stream, file transfer) and provide the single content transmission to a user device.

FIG. 1 illustrates various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a headend), which can receive content (e.g., data, input programming, and the like) from multiple sources. The central location 101 can combine the content from the various sources and can distribute the content to user (e.g., subscriber) locations location 119) via distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be a Pay-Per-View server, a data server, an interact router, a network system, a phone system, and the like. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of system 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. In one aspect, the distribution system 116 can comprise a content packager 122 configured to package content from a variety of content sources. For example, the content packager 122 can package multiple content transmissions from one or more sources as a single content transmission. At user location 119, a decoder 120, such as a gateway or home communications terminal (HCT) can decode, if needed, the signals for display on a display device, such as on a television set (TV) 121 or a computer monitor. Those skilled in the art will appreciate that the signal can be decoded in a variety of equipment, including an HCT, a computer, a TV, a monitor, or satellite dish. In an exemplary aspect, the methods and systems disclosed can be located within, or performed on, one or more HCT's 120, TV's 121, central locations 101, DVR's, home theater PC's, and the like.

In an aspect, user location 119 is not fixed. By way of example, a user can receive content from the distribution system 116 on a mobile device such as a laptop computer, PDA, smartphone, GPS, vehicle entertainment system, portable media player, and the like.

In an exemplary embodiment, the methods and systems disclosed can be located within one or more HCT 120, content packager 122, encoder 112, and/or other device. For example, the HCT 120 can be configured to render two separate content transmission (e.g., received from two different sources) as a single content transmission. As another example, the content packager 122 can be configured to package video, audio, data, or other content as a single content transmission. The content packager 122 can select and package the content based on a preference received from a user and/or other user information. The content packager 122 can also be configured to package content (e.g., a first content stream, and a second content stream) as a single content transmission. The content packager 122 can be configured to package the single content transmission based on a preference received from a user or other user information.

In an aspect, the methods and systems can utilize digital audio/video compression such as MPEG, or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-2, and MPEG-4 standards are hereinafter referred to as MPEG. In an MPEG encoded transmission, content and other data are transmitted in packets, which collectively make up a transport stream. Additional information regarding transport stream packets, the composition of the transport stream, types of MPEG tables, and other aspects of the MPEG standards are described below. In an exemplary embodiment, the present methods and systems can employ transmission of MPEG packets. However, the present methods and systems are not so limited, and can be implemented using other types of transmission and data.

The output of a single MPEG audio and/or video coder is called a transport stream comprised of one or more elementary streams. An elementary stream is an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs and their associated PESs can be multiplexed into a multi program transport stream. A multi program transport stream has a program clock reference (PCR) mechanism that allows transmission of multiple clocks, one of which is selected and regenerated at the decoder.

A multi program transport stream is more than just a multiplex of audio and video PESs. In addition to the compressed audio, video and data, a transport stream includes metadata describing the bit stream. This includes the program association table (PAT) that lists every program in the multi program transport stream. Each entry in the PAT points to a program map table (PMT) that lists the elementary streams making up each program. Some programs will be unencrypted, but some programs may be subject to conditional access (encryption) and this information is also carried in the metadata. The transport stream can be comprised of fixed-size data packets, for example, each containing 188 bytes. Each packet can carry a program identifier code (PID). Packets in the same elementary stream can have the same PID, so that the decoder (or a demultiplexer) can select the elementary stream(s) it wants and reject the remainder. Packet continuity counts ensure that every packet that is needed to decode a stream is received. A synchronization system can be used so that decoders can correctly identify the beginning of each packet and deserialize the bit stream into words.

A content item, such as a program, can be a group of one or more PIDs that are related to each other. For instance, a multi program transport stream used in digital television might contain three programs, to represent three television channels. Suppose each channel consists of one video stream, one or two audio streams, and any necessary metadata. A receiver wishing to tune to a particular "channel" merely has to decode the payload of the PIDs associated with its program number or program ID. It can discard the contents of all other PIDs.

The multi program transport stream carries many different programs and each may use a different compression factor and a bit rate that can change dynamically even though the overall bit rate stays constant. This behavior is called statistical multiplexing and it allows a program that is handling difficult material to borrow bandwidth from a program handling easy material. Each video PES can have a different number of audio and data PESs associated with it. Despite this flexibility, a decoder must be able to change from one program to the next and correctly select the appropriate audio and data channels. Some of the programs can be protected so that they can only be viewed by those who have paid a subscription or fee. The transport stream can comprise Conditional Access (CA) information to administer this protection. The transport stream can comprise Program Specific Information (PSI) to handle these tasks.

Figure 2:
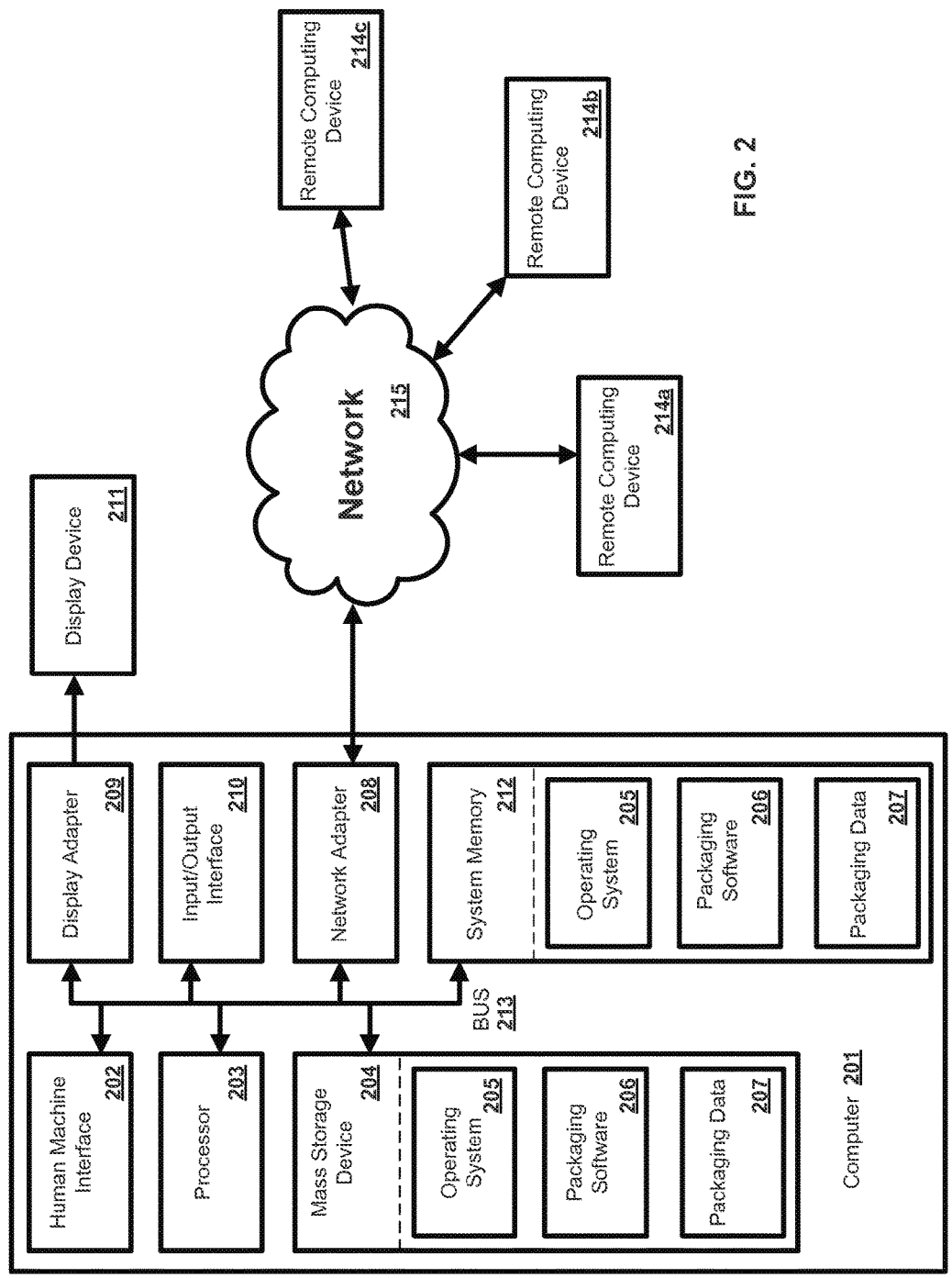
FIG. 2 is a block diagram illustrating an example computing device in which the present systems and methods can operate.

In an exemplary aspect, the methods and systems can be implemented on a computer 201 as illustrated in FIG. 2 and described below. By way of example, at least one of the content manager 302, user device 304, first content source 312, and second content source 316 of FIG. 3 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 201. The components of the computer 201 can comprise, but are not limited to, one or more processors 203, a system memory 212, and a system bus 213 that couples various system components including the processors 203 to the system memory 212. In the case of multiple processors 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processors 203, a mass storage device 204, an operating system 205, packaging software 206, packaging data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computer 201 typically comprises a variety of computer readable media. Exemplary readable media can be any available media that is accessible by the computer 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as packaging data 207 and/or program modules such as operating system 205 and packaging software 206 that are immediately accessible to and/or are presently operated on by the processors 203.

In another aspect, the computer 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computer 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories read only memories (ROM), electrically erasable programmable read-only memory (EEPROM), and the like.

Optionally, any number of program modules can be stored on the mass storage device 204, including by way of example, an operating system 205 and packaging software 206. Each of the operating system 205 and packaging software 206 (or some combination thereof) can comprise elements of the programming and the packaging software 206. Packaging data 207 can also be stored on the mass storage device 204. Packaging data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processors 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computer 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computer 201 via Input/Output interface 210. Any step and/or result of the methods can be output in any form to an output device. Such output can be any form of visual representation, including, but not limited to, textual, graphical, animation, audio, tactile, and the like. The display 211 and computer 201 can be part of one device, or separate devices.

The computer 201 can operate in a networked environment using logical connections to one or more remote computing devices 214a,b,c. By way of example, a remote computing device can be a personal computer, portable computer, smartphone, a server, a router, a network computer, a peer device or other common network node, and so on. Logical connections between the computer 201 and a remote computing device 214a,b,c, can be made via a network 215, such as a local area network (LAN) and/or a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the processors 203 of the computer. An implementation of packaging software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 3:
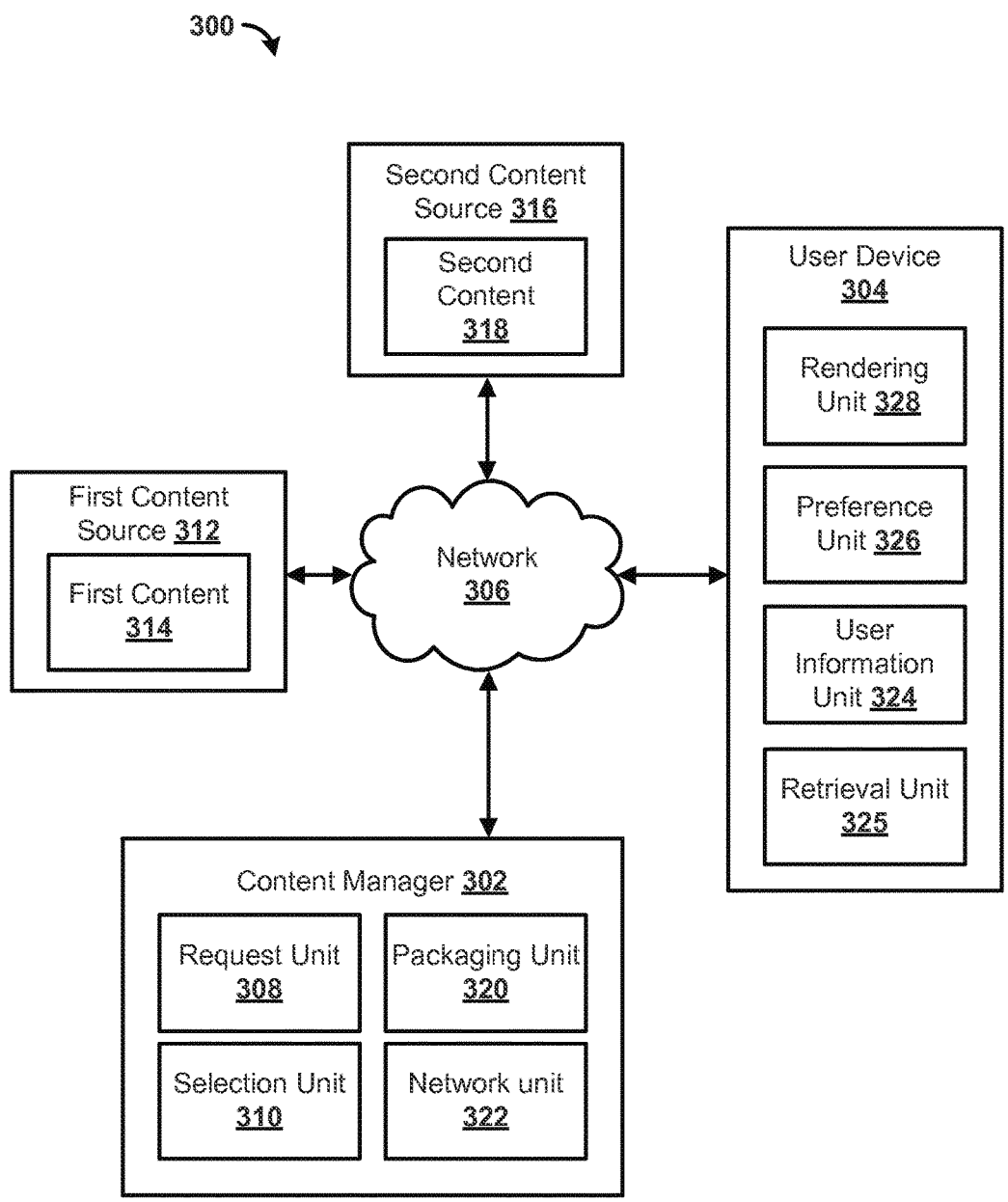
FIG. 3 a block diagram illustrating an example system.

FIG. 3 is a block diagram illustrating an example system 300 for providing content. In one aspect, the system 300 can comprise a content manager 302 configured to manage content (e.g., video, audio, images, text, and the like) for a plurality of users (e.g., content subscribers). For example, the content manager 302 can be communicatively coupled to a plurality of user devices 304 through a network 306. In one aspect, the network 306 can comprise a packet switched network (e.g., internet protocol based network), a non-packet switched network (e.g., quadrature amplitude modulation based network), and/or the like. The network 306 can comprise network adapters, switches, routers, modems, and the like connected through wireless links (e.g., radio frequency, satellite) and/or physical links (fiber optic cable, coaxial cable, Ethernet cable, or a combination thereof). In one aspect, the network 306 can be configured to provide communication from telephone, cellular, modem, and/or other electronic devices to and throughout the system 300.

In one aspect, the content manager 302 can comprise a request unit 308 configured to receive requests for content. For example, the request unit 308 can receive a request for content from the user device 304. The request can comprise a request for a particular content item, such as a show, an episode, a program, a movie, and/or the like. In one aspect, the request unit 308 can be configured to receive a preference from the user device 304. The preference can comprise an audio preference, data preference, video preference, and/or the like. In another aspect, the request unit 308 can be configured to receive the preference without requesting the preference from the user device 304. For example, the preference can be received with the request for content from the user device 304. In some scenarios, the request unit 308 can be configured to receive multiple preferences for the same content. The request unit 308 can receive one or more preferences for one user requesting first video content.

In one aspect, the request unit 308 can be configured to provide options for preferences to the user device 304. For example, the request unit 308 can provide the options for preferences based on a request for content. The request unit 308 can determine the options for preferences based on user information, such as customer account information, subscription plan information, geographic region of the user device, user history, user interests (e.g., hobbies, favorite teams, political views), timing information, and/or the like. The request unit 308 can provide the selected options for preferences to the user device 304.

In one aspect, an audio preference can be a preference for particular or type of audio content (e.g., stream, file) to accompany a video content (e.g., stream, file). In one aspect, an audio preference can comprise a language preference. For example, the audio preference can be a preference for audio content in English, Spanish, French, German, Italian, Portuguese, Arabic, Japanese, Chinese, or other language. In one aspect, the audio preference can be a preference for a sound profile. For example, the sound profile can be for mono, stereo, surround sound, and/or the like. The audio preference can comprise a commentary preference. For example, a commentary preference can be a preference for a commentary for a sports event, news event, performance event, live event, and/or the like. In another aspect, the audio preference can be a preference for a secondary audio stream. A secondary audio stream can comprise, for example, a stream comprise additional audio enhancements (e.g., to accompany 3D, Ultra HD, or similar immersive content), additional commentary, and/or the like. In an aspect, the audio preference can be a preference for parental control purpose (e.g., certain words removed). In an aspect, the audio preference can be a preference based on ratings, age group, and/or the like. For example, the audio preference can comprise a preference for a children's version e.g., no music or effect). Other examples of preferences can comprise preferences for audio to aid with hearing and sight impaired viewers such as video descriptions and hearing impaired audio (audio with diminished background and increased dialog levels). Another audio preference can comprise a preference for a director's (e.g., or other individual) commentary.

In one aspect, the content manager 302 can comprise a selection unit 310 configured to select content. The selection unit 310 can be configured to select content based on a request and/or preference (e.g., audio preference) received by the request unit 308. In one aspect, the selection unit 310 can be configured to select content based on an identifier, such as a location identifier (e.g., uniform resource locator), content identifier, and/or other information received in the request from the user device 304. The selection unit 310 can be configured to select content from one or more content sources. For example, the system 300 can comprise a first content source 312 comprising first content 314. The system 300 can comprise a second content source 316 comprising second content. The first content 314 can comprise video, audio, images, text, electronic program guide data, and/or the like. The second content 318 can comprise video, audio, images, text, electronic program guide data, and/or the like. In some implementations, the first content 314 can comprise content in a first format, such as video. The second content 318 can comprise content in a second format, such as audio. The first content 314 and/or second content 318 can comprise one or more content transmissions, such as video streams, audio streams, data streams, video files, audio files, data files, a combination thereof, and/or the like.

In one aspect, the selection unit 310 can be configured to select content from the first content source 312 and/or the second content source 316. For example, the selection unit 310 can be configured to select content from the first content source 312 and/or the second content source 316 based on a request and an audio preference received by the request unit 308. As an illustration, the selection unit 310 can select video content from the first content 314 based on the request. The selection unit 310 can select audio content from the second content 318 based on the request and the audio preference. In some implementations, the selection unit 310 can select video content and two separate audio content, such as first audio content and second audio content. The audio content can be selected from the same content source as the video content. In one scenario, both the first audio content and the second audio content can be selected from a different content source (e.g., second content source 316) than the content source from which the video content is selected (e.g., first content source 312). In another scenario, one audio content can be selected from the same content source (e.g., first content source 312) as the video content and the other audio content can be selected from another content source e.g., second content source 316).

In one aspect, the content manager 302 can comprise a packaging unit 320 configured to package content for distribution to a user. For example, the packaging unit 320 can package the content selected by the selection unit 310. For example, the packaging unit 320 can package first selected content and second selected content for a single content transmission (e.g., content stream, file transfer) or other type of transmission. As a further example, the packaging unit 320 can package video content selected by the selection unit 310 with audio content selected by the selection unit 310. The packaging unit 320 can be configured to package the video content and audio content for a first content transmission. In one aspect, packaging the first selected content (e.g., video content) and the second selected content (e.g., audio content) can comprise associating the first selected content and the second selected content with a file container. In another aspect, packaging the first selected content and the second selected content can comprise packaging the first selected content (e.g., video content) and the second selected content e.g., audio content) in a transmission container, such as a content stream container, transport stream container, MPEG transport stream container, and/or the like. Packaging the first selected content and the second selected content can comprise packaging the second selected content (e.g., audio content) as an audio track of a fragmented (e.g., MPEG fragmented) file container associated with the first selected content (e.g., video content). Other containers can include, but are not limited to, MPEG TS segmented, MP4, Quicktime, (MOV), Flash (FLV), and the like.

In one aspect, the packaging the first selected content and the second selected content can comprise encrypting the first selected content and second selected content with one or more encryption keys. As another example, the first selected content can be encrypted according to a first encryption key, and the second selected content can be encrypted according to a second encryption key. In an aspect, the first encryption key can be the same as the second encryption key. In another aspect, the packaging the first selected content and the second selected content can comprise encoding the first selected content and the second selected content based on one or more encoding standards. For example, the first selected content and the second selected content can be encoded according to a first encoding standard. As another example, the first selected content can be encoding according to the first encoding standard, and the second selected content can be encoded according to a second encoding standard.

In one aspect, the content manager 302 can comprise a network unit 322 configured to provide content across the network 306. In one aspect, the network unit 322 can be configured to provide the content packaged b the packaging unit 320 to one or more users. The network unit 322 can be configured to provide packaged content based on a packet switched network protocol, such as interact protocol. For example, the network unit 322 can comprise a content server configured to provide a first content transmission to the user device 304. The content server can provide the first content transmission as a plurality of content fragments. The network unit 322 can also provide other content transmission to other user devices.

In another aspect, the network unit 322 can be configured to provide content based on a non-packet switching protocol, such as a quadrature amplitude modulation or similar protocol. The network unit 322 can comprise a modulator, multiplexer, and/or the like for providing content to the user device 304 according to the non-packet switched network protocol. As a further example, the network unit 322 can comprise a converged access platform (e.g., converged cable access platform) configured to provide content across the network 306.

In one aspect, the network unit 322 can be configured to provide content selected by the selection unit 310 as one or more content transmissions. For example, the network unit 322 can provide the first selected content as a multicast content transmission. The network unit 322 can provide the first multicast content transmission to a plurality of users. The network unit 322 can provide the second selected content as a first unicast content transmission. The first unicast content transmission can be provided to, for example, a user associated a specific user preference. Network unit 322 can provide additional unicast content transmissions to other users and/or devices, such as users and/or devices receiving the multicast content transmission.

As previously referenced, the system 300 can comprise one or more user devices 304. A user device 304 can comprise a computing station (e.g., desktop computer, computer work station), laptop device, tablet device, mobile device, smart device (e.g., smart phone, smart watch, smart glasses, smart vehicle, smart accessory), set top box, digital streaming device, television, gateway, and/or the like.

In one aspect, a user device 304 can comprise a user information unit 324 configured to store user information. For example, user information can comprise audio preference information, preferred languages, commentary, sports team, and/or the like. As another example, user information can comprise a history of previous audio preferences, viewing history, playback settings, and/or the like. User information can comprise demographic information, such as age, ethnicity, gender, geographic location, and/or the like for one or more users accessing the device.

In one aspect, a user device 304 can comprise a retrieval unit 325 configured to retrieve content from one or more locations. For example, the retrieval unit 325 can be configured to request content from the content manager 302. As another example, the retrieval unit 325 can be configured to request content from the first content source 312 and/or second content source 316. For example, the retrieval unit 325 can request video content from the first content source 312. The retrieval unit 325 can be configured to request audio content from the second content source 316.

It should be noted that in some scenarios the first content source 312 and the second content source 316 can be configured to encode the first content and the second content according the same encoding standard. In another aspect, the first content source 312 and the second content source 316 can be configured to encrypt the first content and the second content according the same encryption key. For example, the retrieval unit 325 can be configured to provide and/or otherwise indicate an encoding standard, an encryption key, and/or the like to the first content source 312 and/or second content source 316. As another example, the first content source 312 can be configured to provide and/or indicate an encoding standard, encryption key, and/or the like to the second content source 316. The second content source 316 can encrypt and/or encode content requested from the user device 304 based on the encoding standard and/or encryption key received from the first content source 312. As a further example, the second content source 316 can be configured to provide and/or indicate an encoding standard, an encryption key, and/or the like to the first content source 312. The first content source 312 can encrypt and/or encode content requested from the user device 304 based on the encoding standard and/or encryption key received from the second content source 316.

In one aspect, a user device 304 can comprise a preference unit 326 configured to select a content preference, such as an audio preference, commentary preference, and/or the like. For example, the preference unit 326 can receive a list of one or more content preference options from the content manager 302. The preference unit 326 can provide the content preference options to a user. The preference unit 326 can be configured to receive a selection of a content preference option from the user. As another example, the preference unit 326 can automatically select a content preference based on the user information stored in the user information unit 324. The preference unit 326 can be configured to provide the content preference to the content manager 302. For example, the preference unit 326 can provide the content preference with a request for content, in response to a request for a content preference, and/or the like.

In one aspect, a user device 304 can comprise a rendering unit 328 configured to render (e.g., display, show, play) content for a user. For example, the rendering unit 328 can render the first content transmission packaged by the packaging unit 320 of the content manager 302. As another example, the rendering unit 328 can be configured to synchronize and render one or more content transmissions (e.g., video transmissions, audio transmissions, textual transmissions, data transmission). As an illustration, the rendering unit 328 can receive a first multicast transmission and a first unicast transmission. The rendering unit 328 can be configured to render the first multicast transmission and first unicast transmission at the same time for a user at the user device 304. For example, the rendering unit 328 can be configured to synchronize the first multicast transmission and first unicast transmission. As another illustration, the rendering unit 328 can receive a first content transmission (e.g., video stream, audio data, and/or data stream) from the first content source 312 and a second content transmission (e.g., video stream, audio data, and/or data stream) from the second content source 316. The rendering unit 328 can synchronize the first content transmission and second content transmission. The rendering unit 328 can provide the synchronized first content transmission and second content transmission to the user for consumption. Additionally, the rendering unit 328 can synchronize and provide additional content transmissions with the first content transmission and/or second content transmission.

In one aspect, synchronization of two or more content transmission can comprise identifying timing information within the content transmission, such as time stamps, or other timing metadata. For example, the content transmissions can comprise time stamps having a common timing coordinate system. In one aspect, synchronization can be performed at the content manager 302, at the user device 304, and/or other device in the network 306. For example, the rendering unit 328 of the user device 304 and/or the packaging unit 320 of the content manager 302 can be configured to synchronize one or more content transmissions. As an example, time stamps can comprise fragment identifiers. The content manager 302 can be configured to obtain a fragment identifier associated with a first content transmission (e.g., video content stream, video file transfer) and identify a point in the second content transmission (e.g., audio content stream, audio file transfer) that corresponds to the obtained fragment identifier, based on timing metadata associated with the second content transmission. Specifically, the content manager 302 can access timing metadata of the second content transmission for a time index associated fragment identifiers of the first content transmission, thereby identifying a point in the second content transmission that corresponds to the obtained fragment identifier in the first content transmission. As a further example, synchronization can be based on a signaling structure within one or more content transmissions, such as the first content transmission and/or second content transmission. The signaling structure can identify fragment and segment points. As an illustration, the signal structure can comprise a Cable Labs Encoder Boundary Point. The signaling structure can comprise a field, such as a "Group ID," embedded in the first content transmission and/or second content transmission. The field can identify the same signal start point between two content transmissions (e.g., the first content transmission and the second content transmission) comprising the same source content (e.g., content item).

In one aspect, the rendering unit 328 can be configured to decode, decrypt, and/or otherwise process the content transmissions. For example, the first content transmission and/or second content transmission can be encrypted with one or more encryption keys. As an illustration, the rendering unit 328 can be configured to decrypt the first content transmission with the first encryption key and the second transmission stream with a second encryption key.

Figure 4:
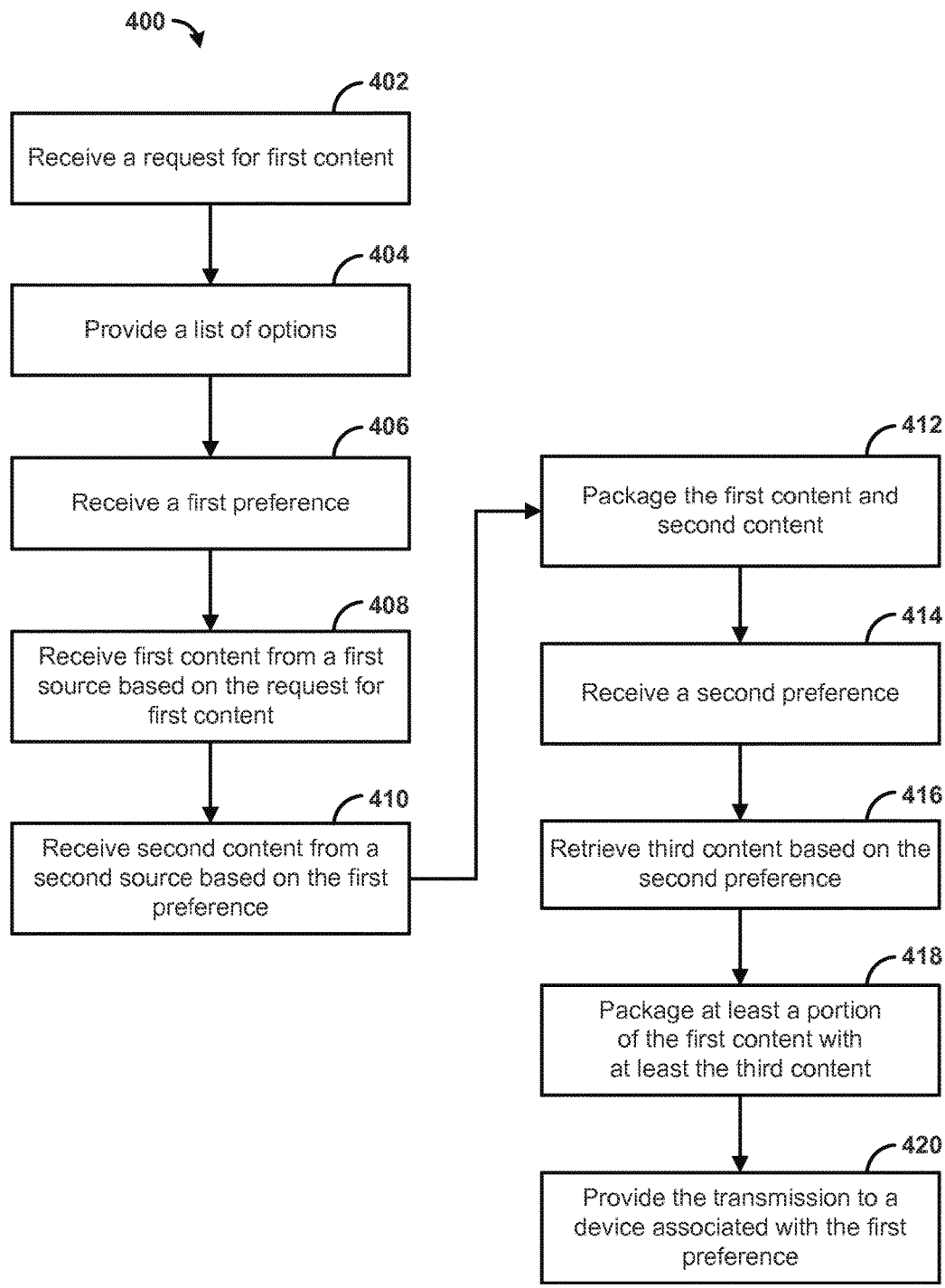
FIG. 4 is a flowchart illustrating an example method.

FIG. 4 is a flowchart illustrating an exemplary method 400 for providing content. It should be noted that in some implementations one or more of the steps of the method 400 may be optional, and the method 400 can be performed without performing all of the steps described herein. Furthermore, additional steps not shown can be performed as part of the method 400 described herein. At step 402, a request for first content can be received. In an aspect, the content manager 302 can receive the request for first content from a device, such as an edge device, user device (e.g., user device 304), and/or the like. As another example, a content source (e.g., first content source 312) can receive the first request for first content. As an example, the first content can comprise a video, such as a show, an episode, a program, a movie, and/or the like. As another example, the user device can comprise a computing station (e.g., desktop computer, computer work station), laptop device, tablet device, mobile device, smart device (e.g., smart phone, smart watch, smart glasses, smart car, smart accessory), set top box, digital streaming device, television, gateway, and/or the like.

At step 404, a list of options can be provided. For example, a list of audio options, video options, text options, quality or performance related options, a combination thereof, and/or the like can be provided. The list of options can be provided to a device (e.g., edge device, user device) requesting the first content. The options can provide options for a particular language, commentary, regional broadcast, sportscast, enhanced content, and/or the like. The list of options can be provided by an interface as part of user settings. The list of options can be provided by a content device in response to the request to the first content. The list of options can be provided before the first content is provided to the device.

At step 406, a first preference can be received. In one aspect, the request unit 308 of the content manager 302 can be configured to request a preference from the user device 304. The request unit 308 can receive one or more preferences for one user requesting first content. The preference can comprise an audio preference, data preference, video preference, and/or the like. For example, receiving the first preference can comprise receiving a selection of an option from the list of options (e.g., audio option from a list of audio options, a video option from a list of video options, a text option from a list of text options, and/or the like). In another aspect, the first preference can be received without the content manager 302 requesting the preference from the user device 304. For example, the preference can be received along with the request for first content from the user device 304. In some scenarios, multiple preferences for the first content can be received.

In one aspect, the request unit 308 of the content manager 302 can provide the options for preferences based on the request for the first content. The request unit 308 can determine the options for preferences based on user information, such as customer account information, subscription plan information, geographic region of the user device, user history, user interests (e.g., hobbies, favorite teams, political views), timing information, and/or the like. When the user of the user device 304 can make a selection based on the options for the preference, the first preference can be received by the content manager 302.

In one aspect, the first preference can be an audio preference. The audio preference can be a preference for particular or type of audio to accompany a video. In one aspect, an audio preference can comprise a language preference. For example, the audio preference can be a preference for an audio stream in English, Spanish, French, German, Italian, Portuguese, Arabic, Japanese, Chinese, or other language. In one aspect, the audio preference can be a preference for a sound profile. For example, the sound profile can be for mono, stereo, surround sound, and/or the like. The audio preference can comprise a commentary preference. For example, a commentary preference can be a preference for a commentary for a sports event, news event, performance event, live event, and/or the like. In an aspect, the audio preference can comprise a sportscast preference. In another aspect, the audio preference can be a preference for a secondary audio stream. A secondary audio stream can comprise, for example, a stream comprise additional audio enhancements (e.g., to accompany 3D, Ultra HD, or similar immersive content), additional commentary, and/or the like. In an aspect, the audio preference can be a preference for parental control purpose (e.g., certain words removed). In an aspect, the audio preference can be a preference for a children's version (e.g., no music or effect). Accordingly, the first preference can be based on at least one of a language preference, sportscast preference, and a commentary preference, and the like.

At step 408, first content can be received (e.g., retrieved) from a first source based on the request for first content. As an example, the selection unit 310 of the content manager 302 can be configured to retrieve the first content based on the request for first content from the first content source 312. For example, the selection unit 310 can request the first content, or a portion thereof from the first source. The first source can provide a location for retrieving the first content and/or transmit the first content in response to the request. In one aspect, the selection unit 310 can retrieve the first content based on an identifier, such as a location identifier e.g., uniform resource locator), content identifier, and/or other information associated with the first content. As an example, a specific movie can be retrieved.

At step 410, second content can be received (e.g., retrieved) from a second source based on the first preference. As an example, the first preference can be an audio stream in a language associated with the first content e.g., a specific content item). As an example, the selection unit 310 can be configured to retrieve the second content from the second content source 316. In one aspect, the selection unit 310 can retrieve the first content based on an identifier, such as a location identifier (e.g., uniform resource locator), content identifier, and/or other information associated with the second content. As an example, an audio stream in a language associated with the first content (e.g., a specific content item) can be retrieved.

At step 412, the first content and second content can be packaged as content for transmission (e.g., content stream, file transfer). The first content and the second content can be packaged for transmission in response to receiving the request (e.g., the request for first content) and the first preference. Packaging can comprise associating content (e.g., first content, second content) from one or more sources (e.g., first source, second source) as a unified file transmission package comprising at least a portion of each of the content (e.g., first content, second content, first video content, first audio content, second audio content, text content, closed caption content) from the one or more sources. Packaging can comprise associating content (e.g., first content, second content) from one or more sources (e.g., first source, second source such that the content from the one or more sources is prepared for transmission as a single content transmission (e.g., stream, file). As an example, the packaging unit 320 of the content manager 302 can be configured to package the first content (e.g., video content) and the second content (e.g., audio content) to a single content transmission for distribution to the user device 304. Specifically, the packaging unit 320 can package video content selected by the selection unit 310 with audio content selected by the selection unit 310. In one aspect, packaging the first selected content (e.g., video content) and the second selected content (e.g., audio content) can comprise associating the first selected content and the second selected content with a file container. For example, packaging the first selected content and the second selected content can comprise packaging the first selected content (e.g., video content) and the second selected content (e.g., audio content) in an transmission container, such as a content stream container, transport stream container, MPEG transport stream container, and/or the like. Packaging the first selected content and the second selected content can comprise packaging the second selected content (e.g., audio content) as an audio track of a fragmented (e.g., MPEG fragmented) file container associated with the first selected content (e.g., video content).

At step 414, a second preference can be received. In an aspect, the second preference can comprise a content preference, audio preference, video preference, text preference, data preference, and/or the like. The second preference can be associated with the first content and/or the second content. As an example, the second preference can comprise a closed captioning preference associated with the first content. In an aspect, the content manager 302 can receive a second preference from user device 304. In an aspect, the second preference can be received via the user of the user device 304 making a selection based on a list of preference options. In another aspect, the second preference can be selected automatically based on the user information associated with the first content requestor and/or user information stored in the user device 304.

As a further illustration, the first preference can comprise a default preference. The second preference can comprise a user selected preference. The first preference can comprise a first language preference. The second preference can comprise a second language preference. The second preference can comprise a preference for a supplemental audio stream configured for playback with content selected based on the first preference. For example, the second preference can comprise a preference for a particular commentary, closed caption data, advertising information, and/or the like. The first preference can be a preference for content (e.g., audio, video) at a first resolution, quality, and/or bit rate. The second preference can be a preference for text information, alternate audio and/or video, and/or the like.

At step 416, third content can be retrieved based on the second preference, in an aspect, the third content can be selected from the first source 312, second source 316, or third source. The third content can comprise video stream, audio stream, data stream, and the like. As an example, the selection unit 310 can retrieve the third content based on an identifier, such as a location identifier (e.g., uniform resource locator), content identifier, and/or other information associated with the third content. As an example, the third content can comprise closed captioning data associated with the first content or other content (e.g., audio, video, text, data). The selection unit 310 can retrieve third content (e.g., closed captioning data) based on the second preference.

At step 418, at least a portion of the first content can be packaged with at least the third content as content for transmission. The portion of the first content and the third content can be packaged in response to receiving the second preference. As an example, the packaging unit 320 can package at least a portion of the first content (e.g., video content) with at least the third content (e.g., closed captioning data associated with the first content) for transmission. As a further example, the third content can be packaged with the first content and second content (e.g., for transmission). For example, step 412 and step 418 can be combined as a single step in which the first content, second content, and third content are packaged together for transmission.

At step 420, the transmission can be provided to a device associated with the first preference. In an aspect, the content transmission can be provided (e.g., unicast, multicast, broadcast) to the device associated with the first preference according to a device identifier and/or network address (e.g., MAC address, IP address) of the device. For example the content transmission can be provided to a device requesting the first content. The device can comprise an edge device, user device, and/or the like.

Figure 5:
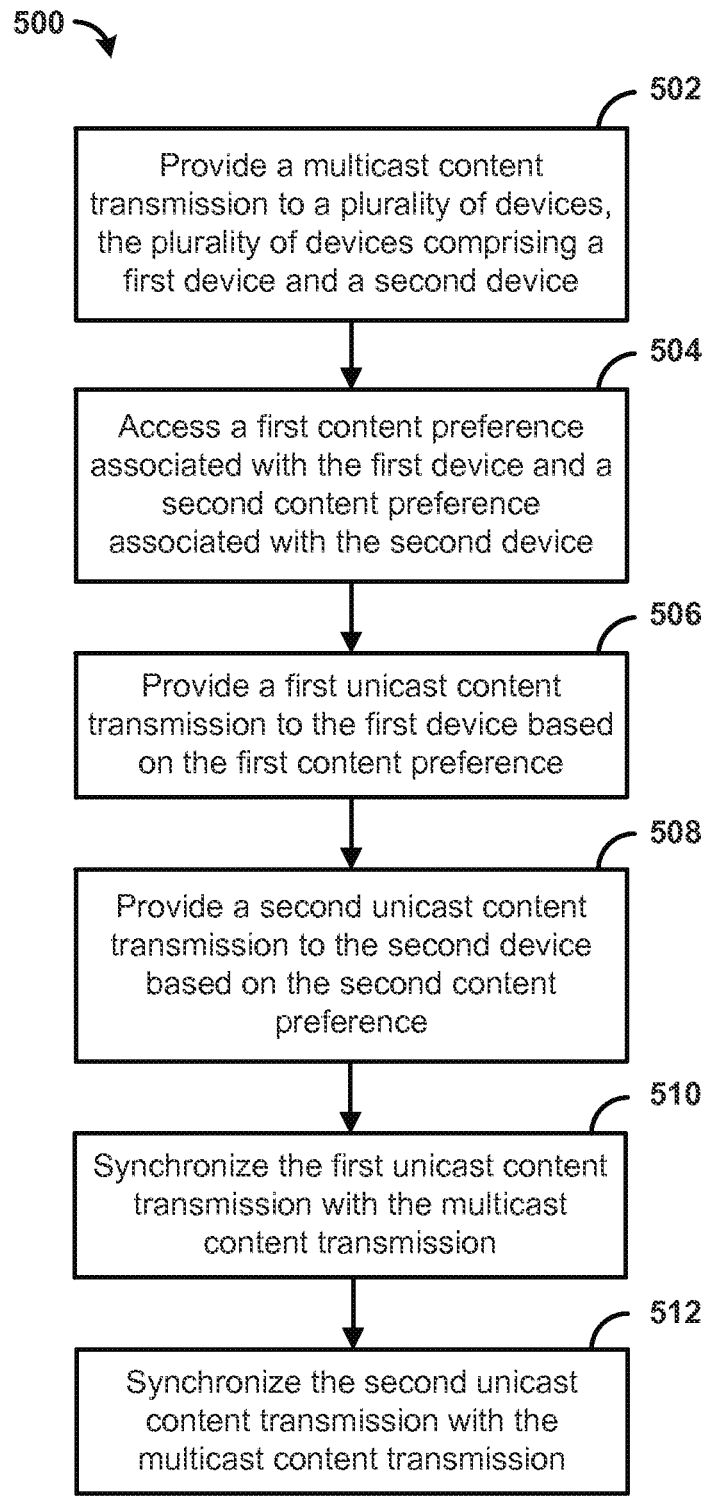
FIG. 5 is a flowchart illustrating another example method.

FIG. 5 is a flowchart illustrating an exemplary method 500 for providing content. It should be noted that in some implementations one or more of the steps of the method 500 may be optional, and the method 500 can be performed without performing all of the steps described herein. Furthermore, additional steps not shown can be performed as part of the method 500 described herein. At step 502, a multicast content transmission (e.g., multicast content stream, multicast file transfer) can be provided to a plurality of devices. The plurality of devices can comprise a first device and a second device. For example, the network unit 322 of the content manager 302 can provide a first content as a multicast content transmission to a plurality of users and/or user devices. As an example, the multicast content transmission can comprise a video content item, such as a show, an episode, a program, a movie, and/or the like. As another example, the first device and/or second device can comprise a computing station (e.g., desktop computer, computer work station), laptop device, tablet device, mobile device, smart device (e.g., smart phone, smart watch, smart glasses, smart car, smart accessory), set top box, digital streaming device, television, gateway, and/or the like.

At step 504, a first content preference associated with the first device and a second content preference associated with the second device can be accessed or received. The first content preference and the second content preference can comprise an audio preference, data preference, video preference, and/or the like. As an example, the first content preference can comprise a preference for an audio stream in a first language (e.g., English) to accompany the multicast content transmission (e.g. video stream). The second content preference can comprise a preference for an audio stream in a second language (e.g., French, Spanish, Korean) to accompany the multicast content transmission.

In one aspect, the request unit 308 of the content manager 302 can be configured to access the first content preference from the first device and access the second content preference from the second device. In an aspect, the first content preference and/or the second content preference can comprise one or more user preferences. For example, the first content preference can comprise a preference for a children's version of an audio stream in the first language. As another example, the second content preference can comprise a preference for an audio stream in the first language or second language with 3D audio enhancement.

In one aspect, the request unit 308 can provide the options for preferences based on the multicast content transmission. The request unit 308 can determine the options for content preferences based on user information and/or user input, such as customer account information, subscription plan information, geographic region of the user device, user history, user interests (e.g., hobbies, favorite teams, political views), timing information, and/or the like. The options can be displayed on the first device and the second device respectively. The first content preference can be made via the first device based on the options for the first content preferences. The second content preference can be made via the second device based on the options for the second content preferences. In an aspect, step 504 can comprise generating or packing for transmission the first unicast content transmission (e.g., an audio stream of a movie in English) based on the first content preference (e.g., an audio in English) and generating the second unicast content transmission (e.g., an audio stream of a movie in French) based on the second content preference (e.g., an audio in French).

At step 506, a first unicast content transmission (e.g., unicast content stream, unicast content file transfer) can be provided to the first device based on the first content preference. As an example, the content manager 302 can request, receive, and/or retrieve the first unicast content transmission (e.g., the audio stream of movie in first language) from the second content source 316. In one aspect, the selection unit 310 can request, receive, and/or retrieve the first unicast content transmission based on an identifier, such as a location identifier (e.g., uniform resource locator), content identifier, and/or other information associated with the first unicast content transmission. As an example, an audio stream in a first language associated with the multicast content transmission (e.g., the specific movie) can be unicast to the first device according to a device identifier and/or network address (e.g., MAC address, IP address) of the first device.

At step 508, a second unicast content stream (e.g., unicast content stream, unicast content file transfer can be provided to the second device based on the second content preference. As an example, the content manager 302 can request, receive, and/or retrieve the first unicast content transmission (e.g., an audio stream of a movie in French) from the second content source 316. In one aspect, the selection unit 310 can retrieve the first content based on an identifier, such as a location identifier (e.g., uniform resource locator), content identifier, and/or other information associated with the first unicast content transmission. As an example, an audio stream in English associated with the multicast content (e.g., the specific movie) can be unicast to the second device according to a device identifier and/or network address (e.g., MAC address, IP address) of the second device.

At step 510, the first unicast content transmission can be synchronized with the multicast content transmission. For example, the first unicast content transmission and the multicast content transmission can comprise time stamps (e.g., or other markers) having a common timing coordinate system. In one aspect, synchronization can be performed at a content manager (e.g., content manager 302), at a user device (e.g., a first user device), and/or other device in a network. As an example, markers or time stamps can comprise fragment identifiers. The content manager 302 can be configured to obtain a fragment identifier associated with the multicast content transmission (e.g., video content stream, video file transfer) and identify a point in the first unicast content transmission (e.g., audio content stream, audio file transfer) that corresponds to the obtained fragment identifier, based on timing meta data associated with the first unicast content transmission. The synchronized first unicast content transmission and multicast content transmission can be consumed on a user device (e.g., a first user device). For example, the first unicast content transmission can comprise content (e.g., secondary audio, text) configured for playback with content (e.g., video, audio) from the multicast content transmission.

At step 512, the second unicast content transmission can be synchronized with the multicast content transmission. For example, the second unicast content transmissions and the multicast content transmission can comprise time stamps having a common timing coordinate system. In one aspect, synchronization can be performed at a content manager (e.g., content manager 302), at a user device (e.g., a second user device), and/or other device in a network. As an example, markers or time stamps can comprise fragment identifiers. The content manager 302 can be configured to obtain a fragment identifier associated with the multicast content transmission (e.g., video content stream, video file transfer) and identify a point in the second unicast content transmission (e.g., audio content stream, audio file transfer) that corresponds to the obtained fragment identifier, based on timing metadata associated with the second unicast content transmission. The synchronized second unicast content transmission and multicast content transmission can be consumed on a user device (e.g., a second user device).

In one aspect, the first unicast content transmission can be packaged (e.g., for transmission to a local media player and/or display) with the multicast content transmission at the first user device. The second unicast content transmission can be packaged (e.g., for transmission to a local media player and/or display) with the multicast content transmission at the second user device. For example, the multicast content transmission can be packaged with other content (e.g., first unicast content stream, second unicast content stream) as a content stream, such as an MPEG stream.

FIG. 6 is a flowchart illustrating an exemplary method 600 for providing content. It should be noted that in some implementations one or more of the steps of the method 600 may be optional, and the method 600 can be performed without performing all of the steps described herein. Furthermore, additional steps not shown can be performed as part of the method 600 described herein. At step 602, first audio content can be selected based on a first audio preference associated with a first device. In an aspect, the first audio preference associated with the first device can be related to user information stored in the first device. As an example, user information can comprise customer account information, subscription plan information, geographic region of the user device, user history, user interests (e.g., hobbies, favorite teams, political views), timing information, and/or the like. The first audio preference can be a preference for particular or type of audio stream to accompany a video stream. For example, the first audio preference can be indicative of audio based on an age group, content rating system, and/or the like. The first audio preference can be indicative of a sound quality, such as mono, stereo, enhanced 3D sound, sound a particular bit rate and/or sampling rate, and/or the like. The first audio preference can comprise a language preference. By way of example, the first audio preference can be received by the request unit 308 of the content manager 302. For first audio preference can be transmitted from a preference unit 326 of a first device. For example, the first device can comprise a computing station (e.g., desktop computer, computer work station), laptop device, tablet device, mobile device, smart device (e.g., smart phone, smart watch, smart glasses, smart car, smart accessory), set top box, digital streaming device, television, gateway, and/or the like. In an aspect, first audio content can be selected based on the first audio preference. For example, the selection unit 310 can select the first audio content based on the language preference, version preference, commentary preference, sound profile, and/or the like indicated in the first audio preference. In one aspect, the selection unit 310 can select the first audio content based on an identifier, such as a location identifier (e.g., uniform resource locator), content identifier, and/or other information associated with the first audio content.

At step 604, second audio content can be selected based on a second audio preference associated with a second device. In an aspect, the second audio preference associated with the second device can be related to user information stored in the second device. As an example, user information can comprise customer account information, subscription plan information, geographic region of the user device, user history, user interests (e.g., hobbies, favorite teams, political views), timing information, and/or the like. The second audio preference can be a preference for a particular or type of audio stream to accompany a video stream. For example, the second audio preference can be indicative of audio based on an age group, content rating system, and/or the like. The second audio preference can be indicative of a sound quality, such as mono, stereo, enhanced 3D sound, sound a particular bit rate and/or sampling rate, and/or the like. The second audio preference can comprise a language preference. The second audio preference can be received by the request unit 308 of the content manager 302. For second audio preference can be transmitted from the preference unit 326 of a second device. For example, the second device can comprise a computing station (e.g., desktop computer, computer work station), laptop device, tablet device, mobile device, smart device e.g., smart phone, smart watch, smart glasses, smart car, smart accessory), set top box, digital streaming device, television, gateway, and/or the like. In an aspect, second audio content can be selected based on the second audio preference. For example, the selection unit 310 can select the second audio content based on the language preference, version preference, commentary preference, sound profile, and the like indicated in the second audio preference. In one aspect, the selection unit 310 can select the second audio content based on an identifier, such as a location identifier (e.g., uniform resource locator), content identifier, and/or other information associated with the second audio content.

At step 606, additional content can be selected. For example, the additional content can comprise video content, audio content, textual content, data content, and/or the like. The additional content can comprise first video content. Additional content can comprise closed captioning data. The additional content can be selected based on user preferences, user profile information (e.g., subscription tier), device history, demographics (e.g., location, gender, age, ethnicity) and/or the like. It should be noted that the additional content, first audio content, and/or second audio content can be stored on and selected from one or more content sources. For example, the first audio content and/or second audio content can be selected from a first source. A first portion of the additional content (e.g., first video content) can be selected from a second source. A second portion of the additional content can be selected from a third source.

At step 608, the first audio content can be packaged with first video content for a first transmission (e.g., content stream, file transfer). As an example, the first video content can comprise a video, such as a show, an episode, a program, a movie, and/or the like. As an example, the packaging unit 320 of the content manager 302 can be configured to package the first video content and the first audio content to a single transmission for distribution. In one aspect, packaging the first video content and the first audio content can comprise associating the first video content and the first audio content with a file container (e.g., a transmission container, content stream container, transport stream container, MPEG transport stream container). For example, packaging the first video content and the first audio content can comprise packaging the first audio content as an audio track of a fragmented (e.g., MPEG fragmented) file container associated with the first video content. On an aspect, packaging the first audio content with the first video content for the first transmission can comprise encrypting the first audio content and the first video content. The first audio content can be encrypted with a first encryption key. The first video content can be encrypted with a second encryption key. In an aspect, the first encryption key can be the same as the second encryption key. In one aspect, the additional content can be packaged with the first audio content and the first video content as the first transmission.

At step 610, the second audio content can be packaged with the first video content for a second transmission (e.g., content stream, file transfer). As an example, the packaging unit 320 of the content manager 302 can be configured to package the first video content and the second audio content to a single transmission (e.g., content stream, file transfer) for distribution. In one aspect, packaging the first video content and the second audio content can comprise associating the first video content and the second audio content with a file container (e.g., MPEG transport stream file container). Packaging can comprise associating content from one or more sources as a unified file transmission package comprising at least a portion of each of the content (e.g., first content, second content, first video content, first audio content, second audio content, text content, closed caption content) from the one or more sources. Packaging can comprise associating content from one or more sources such that the content from the one or more sources is prepared for transmission as a single content transmission (e.g., stream, file). For example, packaging the first video content and the second audio content can comprise packaging the second audio content as an audio track of a fragmented (e.g., MPEG fragmented) file container associated with the first video content. In an aspect, packaging the second audio content with the first video content for a second transmission can comprise encrypting the second audio content and the first video content. The second audio content can be encrypted with a third encryption key. The first video content can be encrypted with a fourth encryption key. In an aspect, the third encryption key can be the same as the fourth encryption key. In another aspect, the first encryption key can be the same as the third encryption key. In another aspect, the second encryption key can be the same as the fourth encryption key. In one aspect, the additional content can be packaged with the first video content and second audio content as the second transmission.

At step 612, the first transmission can be provided to the first device. In an aspect, the first transmission can be provided (e.g., unicast, multicast, broadcast) to the first device according to a device identifier and/or network address (e.g., MAC address, IP address) of the first device.

At step 614, the second transmission can be provided to the second device. In an aspect, the second transmission can be provided (e.g., unicast, multicast, broadcast) to the second device according to a device identifier and/or network address (e.g., MAC address, IP address) of the second device.

At step 616, the first transmission can be decrypted at the first device. The first transmission can be decrypted using one or more encryption keys used for and/or mathematically related to encryption of the first audio content and the first video content when the first audio content and the first video content is packaged as the first transmission.

At step 618, the second transmission can be decrypted at the second device. The second transmission can be decrypted using one or more encryption keys used for and/or mathematically related to encryption of the second audio content and the first video content when the second audio content and the first video content is packaged as the second transmission.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   receiving, from a user device, a request for video content;
   providing a list of audio options to the user device;
   receiving, based on an indication of a selection of an audio option from the list of audio options, a first audio preference associated with the user device;
   receiving a second audio preference associated with the user device;
   retrieving, based on the request, the video content;
   retrieving, based on the first audio preference, first audio content having a first bit rate;
   retrieving, based on the second audio preference, second audio content having a second bit rate that is greater than or less than the first bit rate;
   synchronizing the video content with the first audio content and the second audio content; and
   packaging the video content with the first audio content and the second audio content for transmission to the user device.

2. The method of claim 1, wherein the first audio content comprises a timing element associated with the first audio content, and wherein the second audio content comprises a timing element associated with the second audio content.

3. The method of claim 1, wherein the first audio preference or the second audio preference is based on a language preference.

4. The method of claim 1, further comprising:
   receiving an indication of a closed captioning preference;
   retrieving, based on the indication of the closed captioning preference, closed captioning content associated with the video content and at least one of the first audio content or the second audio content; and
   packaging at least a portion of the video content, at least a portion of the first audio content, and at least a portion of the second audio content with the closed captioning content for transmission.

5. The method of claim 1, further comprising transmitting, to the user device, the video content, the first audio content, and the second audio content audio content.

6. The method of claim 1, wherein packaging the video content with the first audio content and the second audio content for transmission comprises:
   encrypting, based on a first encryption key, the video content; and
   encrypting, based on a second encryption key, the first audio content and the second audio content.

7. The method of claim 6, wherein the video content is encrypted by a first device, and wherein the first audio content and the second audio content audio content are each encrypted by a second device.

8. The method of claim 1, wherein packaging the video content with the first audio content and the second audio content comprises packaging the first audio content and the second audio content as at least one audio track of a fragmented file comprising the video content.

9. The method of claim 1, wherein the packaged content comprises an MPEG transport stream container.

10. The method of claim 1, wherein the video content comprises a timestamp and a signal start point, wherein the timing element associated with the first audio content comprises the timestamp and the signal start point, and wherein the second audio content comprises the timestamp and the signal start point.

11. The method of claim 1, further comprising transmitting, to the user device, the packaged content.

12. The method of claim 1, wherein at least one of the first audio preference or the second audio preference comprises a preference for additional audio enhancements.

13. The method of claim 12, wherein the additional audio enhancements comprise immersive content.

14. A method comprising:
   receiving, from a user device, a request for video content;
   providing, to the user device, a list of audio options;
   receiving, from the user device, an indication of a selection of at least one audio option from the list of audio options;
   transmitting an indication of the selection and a request to receive the video content;
   receiving, based on the transmitted request to receive the video content and the indication of the selection of the at least one audio option, packaged content comprising the video content and, based on the selection, first audio content having a first bit rate and second audio content having a second bit rate greater than or less than the first bit rate; and
   transmitting, to the user device, the packaged content.

15. The method of claim 14, wherein the selection comprises an audio commentary option.

16. The method of claim 14, wherein the packaged content comprises a content stream container for streaming, from the user device, the video content, the first audio content, and the second audio content.

17. An apparatus, comprising:
   one or more processors; and
   a memory having stored thereon processor executable instructions that, when executed by the one or more processors, cause the apparatus to:
   receive, from a user device, a request for video content;
   provide a list of audio options to the user device;

receive, based on an indication of a selection of an audio option from the list of audio options, a first audio preference associated with the user device;

receive a second audio preference associated with the user device;

retrieve, based on the request, the video content;

retrieve, based on the first audio preference, first audio content having a first bit rate, retrieve, based on the second audio preference, second audio content having a bit rate that is greater than or less than the first bit rate, synchronize the video content with the first audio content and the second audio content; and packaging the video content with the first audio content and the second audio content for transmission to the user device.

18. The apparatus of claim 17, wherein the processor executable instructions that, when executed by the one or more processors, cause the apparatus to package the video content with the first audio content and the second audio content further comprise processor executable instructions that, when executed by the one or more processors, cause the apparatus to encrypt the video content with a first encryption key and encrypt the first audio content and the second audio content each with a second encryption key.

19. The apparatus of claim 17, wherein the first audio content comprises a timing element associated with the first audio content, and wherein the second audio content comprises a timing element associated with the second audio content.

20. The apparatus of claim 17, wherein the first audio preference or the second audio preference is based on an audio sportscast preference.

* * * * *